(12) United States Patent
Nagy

(10) Patent No.: US 9,056,554 B2
(45) Date of Patent: Jun. 16, 2015

(54) ASSEMBLY FOR ELECTRICALLY RECHARGING VEHICLES

(71) Applicant: KAPSCH TRAFFICCOM AG, Vienna (AT)

(72) Inventor: Oliver Nagy, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 0 days.

(21) Appl. No.: 13/928,298

(22) Filed: Jun. 26, 2013

(65) Prior Publication Data

US 2013/0285607 A1      Oct. 31, 2013

Related U.S. Application Data

(62) Division of application No. 13/027,089, filed on Feb. 14, 2011, now Pat. No. 8,558,502.

(30) Foreign Application Priority Data

Feb. 18, 2010   (EP) .................................. 10450022

(51) Int. Cl.
*H02J 7/00* (2006.01)
*B60L 11/18* (2006.01)
(Continued)

(52) U.S. Cl.
CPC ......... *B60L 11/1824* (2013.01); *B60L 11/1816* (2013.01); *B60L 11/1825* (2013.01); *G07B 15/063* (2013.01); *G07F 15/003* (2013.01); *G07F 15/005* (2013.01); *Y02T 10/7005* (2013.01); *Y02T 10/7088* (2013.01); *Y02T 10/7258* (2013.01); *Y02T 90/121* (2013.01);
(Continued)

(58) Field of Classification Search
CPC ....................................................... Y02T 90/14
USPC ............................................................ 320/109
See application file for complete search history.

(56) References Cited

U.S. PATENT DOCUMENTS 5,461,298 A  * 10/1995  Lara et al. ..................... 320/109
6,181,991 B1    1/2001   Kondo et al.
7,693,609 B2 *  4/2010   Kressner et al. ............. 700/291
(Continued)

FOREIGN PATENT DOCUMENTS

DE          103 04 284 A1    8/2004
GB             2438979 A    12/2007
(Continued)

OTHER PUBLICATIONS

Extended European Search Report for corresponding European Patent Application No. 10 450 022.8, dated Jul. 6, 2010, 6pp.
(Continued)

*Primary Examiner* — Edwards Tso
*Assistant Examiner* — Ahmed Omar
(74) *Attorney, Agent, or Firm* — Fiala & Weaver P.L.L.C.

(57) ABSTRACT

An assembly for electrically recharging vehicles, to which individual radio units are assigned, having a parking space for a vehicle, a recharging station assigned to the parking space for cable-connected recharging of a vehicle located therein, and a transceiver connecting to the recharging station for communication with a radio unit, wherein the transceiver clears the recharging station for the recharging process depending on the communication with the radio unit, and the transceiver has a communication zone, which is restricted to the region of the parking space or can locate a radio unit as being located in this restricted region.

8 Claims, 2 Drawing Sheets

(51) Int. Cl.
*G07B 15/06* (2011.01)
*G07F 15/00* (2006.01)

(52) U.S. Cl.
CPC ............... *Y02T 90/128* (2013.01); *Y02T 90/14* (2013.01); *Y02T 90/16* (2013.01)

(56) References Cited

U.S. PATENT DOCUMENTS

| | | | |
|---|---|---|---|
| 8,446,124 | B2 | 5/2013 | Nagy et al. |
| 8,558,502 | B2 | 10/2013 | Nagy |
| 2007/0090937 | A1 | 4/2007 | Stabler |
| 2008/0221746 | A1* | 9/2008 | Plishner ............ 701/22 |
| 2009/0174365 | A1 | 7/2009 | Lowenthal et al. |
| 2009/0177580 | A1 | 7/2009 | Lowenthal et al. |
| 2012/0181986 | A1* | 7/2012 | Lowenthal et al. ........ 320/109 |
| 2013/0265007 | A1* | 10/2013 | Leary ............ 320/109 |

FOREIGN PATENT DOCUMENTS

| | | |
|---|---|---|
| WO | WO 99/40544 | 8/1999 |
| WO | WO 01/03983 A1 | 1/2001 |
| WO | WO 2005/124581 A2 | 12/2005 |
| WO | WO 2006/127185 A2 | 11/2006 |
| WO | 2009089249 A1 | 7/2009 |

OTHER PUBLICATIONS

IP.com Prior Art Database; Method, System, and apparatus for reserving the use of a re-charging station for a Plug-in Hybrid Electric Vehicle, 3pp.
European Office action dated Apr. 7, 2011 for European Patent Application No. 10 450 022.8, 6pp.
European Summons dated Mar. 22, 2012 for European Patent Application No. 10 450 022.8, 6pp.
Office Action received in Australian Application No. 2011200085, dated Dec. 5, 2013, 4 pages.
Tian et al., "IBM Smart Surveillance System (S3): Event Based Video Surveillance System With an Open and Extensible Framework", Machine Vision and Applications, Springer, 2008, vol. 19, pp. 315-327.
Extended European Search Report received for EP Patent Application No. 12194439.1, mailed on Mar. 26, 2014, 8 pages.(Official Copy Only).
Patent Examination Report received for Australian Patent Application No. 2014201617, Issued on Jan. 14, 2015, 3 pages.

* cited by examiner

ASSEMBLY FOR ELECTRICALLY RECHARGING VEHICLES

CROSS-REFERENCE TO RELATED APPLICATION(S)

This application is a divisional of U.S. patent application Ser. No. 13/027,089, filed on Feb. 14, 2011, which claims priority to European Patent Application No. 10 450 022.8, filed on Feb. 18, 2010, the contents of which are hereby expressly incorporated by reference.

FIELD OF THE INVENTION

The present invention relates to an assembly for electrically recharging vehicles, to which individual radio units are assigned.

BACKGROUND

Typically, the operators of some vehicles are equipped with radio units, for example RFID transponders such as those used for the payment of toll charges according to the Californian FasTrak® system. These radio units may be used to recharge an electric (or hybrid) vehicle via a charging assembly. However, in this case, no unequivocal assignment is assured between the vehicle recharged by the assembly on the one hand, and a payment account referenced in the radio unit of the user in a central system, on the other, since the relationship only exists between the assembly and the user. Thus, for example, a different vehicle could be recharged at the cost of the user, or a user could be asked to pay for recharging a different vehicle.

SUMMARY

In some embodiments, the present invention provides an assembly for recharging electric vehicles that has an increased security of operation. The invention includes an assembly in which a transceiver has a communication zone, which is restricted to the region of the parking space or can locate a radio unit as being located in a restricted region. In this way, an essential assignment between the vehicle to be recharged and the radio unit is achieved so as to structurally exclude any misuse ("security by design").

In some embodiments, the present invention is an assembly for electrically recharging vehicles, to which individual radio units are assigned, having a parking space for a vehicle, a recharging station assigned to the parking space for cable-connected recharging of a vehicle located therein by means of a charging cable, and a transceiver connecting to the recharging station for communication with a radio unit, wherein the transceiver activates (for example, clears or unlocks) the recharging station for the recharging process depending on the communication with the radio unit.

DETAILED DESCRIPTION

In some embodiments, the transceiver of the invention is configured in the manner of a radio beacon for communication with radio units, which are vehicle-based OBUs of a wireless road toll system. The vehicle linkage and vehicle assignment during the recharging process can be additionally reinforced by using fixed OBUs (onboard units). Moreover, the existing infrastructure of wireless road toll systems with existing OBUs can be employed in an extremely advantageous manner in order to quickly set up an extensive electric filling station network for electric vehicles or quickly equip car parks, multistory car parts etc, with recharging assemblies for all parking spaces.

In some embodiments, the transceiver may be a beacon operating according to the dedicated short-range communication (DSRC) or wireless access in a vehicle environment (WAVE) standard for communication with standardised DSRC or WAVE OBUs.

According to some embodiments of the invention, the electrical charging parameters of the recharging process are controlled on the basis of data, which the transceiver reads from the radio unit. This data can directly specify the electrical charging parameters, for example charging current, charging voltage, charging characteristic etc. Alternatively, the data can refer to those charging parameters filed in a central computer for this radio unit.

In some embodiments of the invention, the assembly is fitted with a camera directed towards the parking space and the recharging station actuates the camera to record an image at the beginning and the end of the recharging process and/or in the event of an interruption, interference or deviation of the recharging process from a given course, or in the event of interference with the shield of the charging cable being detected. The security against abuse and manipulation can be further enhanced as a result of this. For example, any dishonest transfer of the charging cable from one vehicle to another can be alerted or automatically detected by means of photos or an attempt at manipulation at the charging cable can already be detected at the outset.

In some embodiments, when the invention is integrated into a road toll system, the assembly transmits transactions concerning the recharging processes to a control center of the road toll system, so that payment for these can be settled or corresponding measures can be taken within the road toll system in the event of anomalies.

Figure 1:
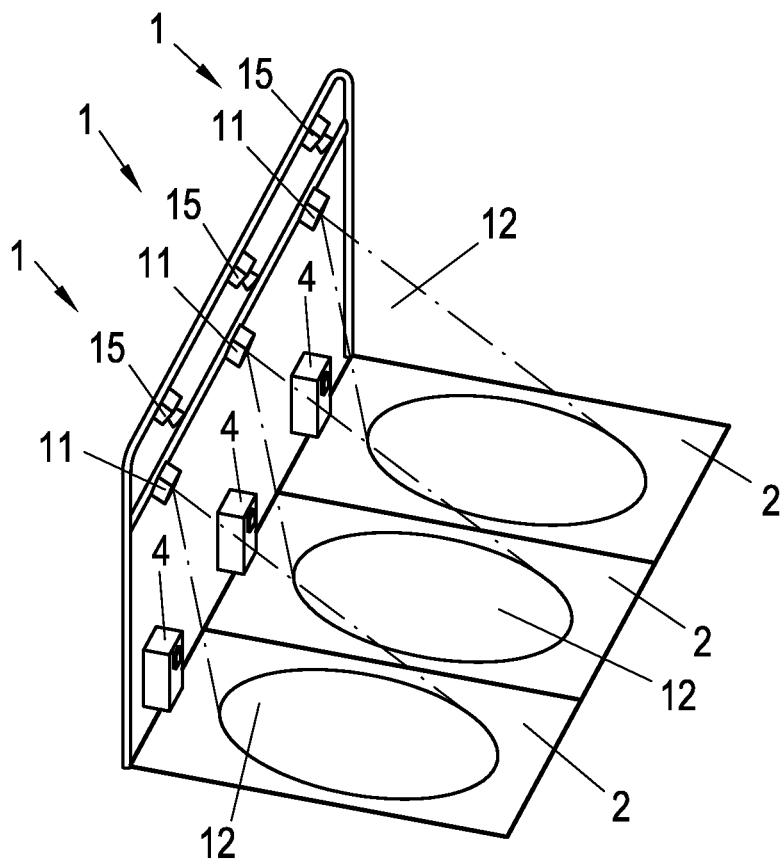
FIG. 1 is an exemplary schematic perspective view of a charging assembly, according to some embodiments of the present invention.
Figure 3:
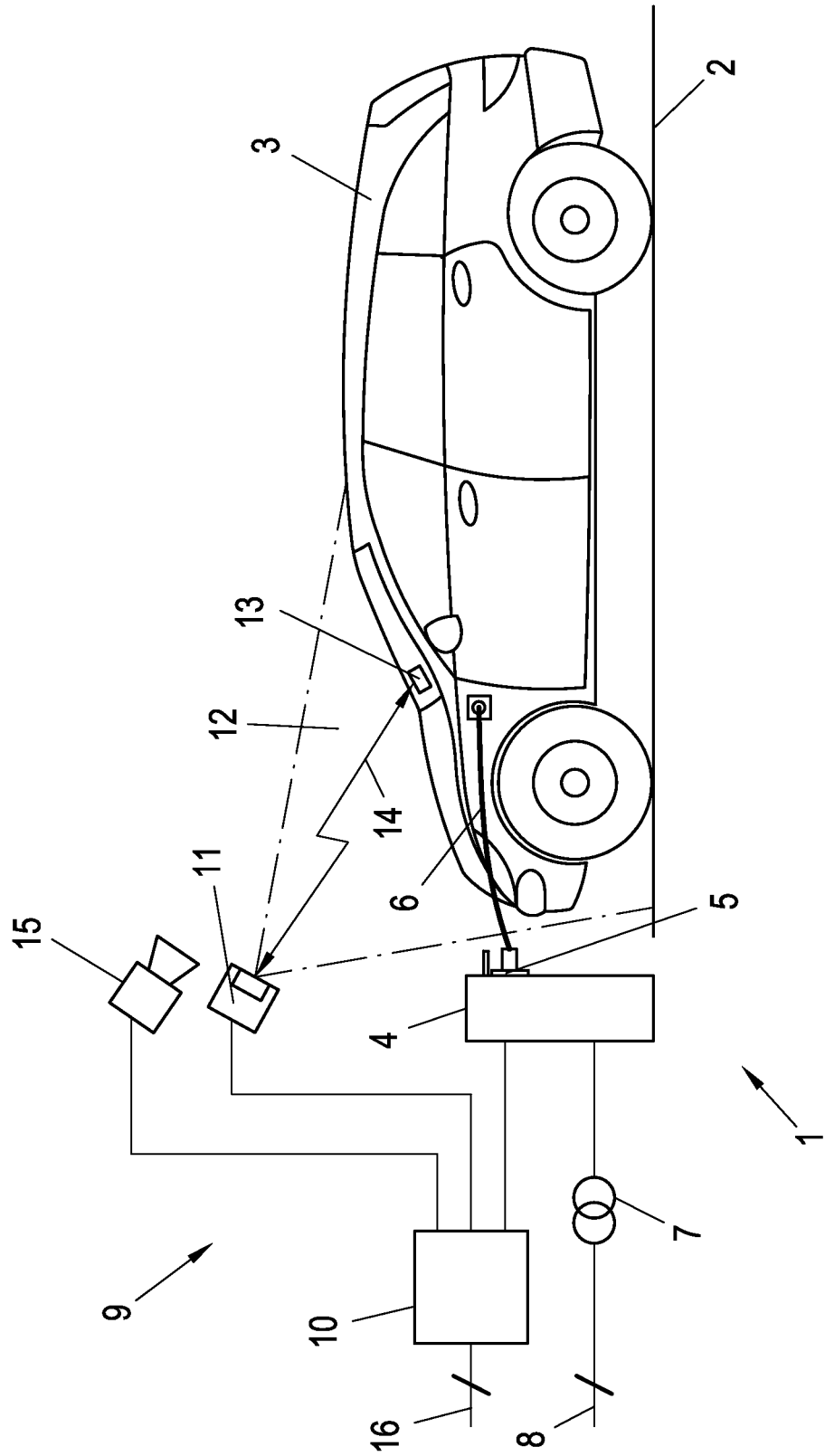
FIG. 3 is an exemplary block diagram in side view of a charging assembly, according to some embodiments of the present invention.

Three exemplary assemblies 1 for electrically recharging electric or hybrid vehicles are shown in FIG. 1. Each assembly 1 comprises a parking space 2 for a vehicle 3 (FIG. 3) as well as a recharging station 4 assigned to the parking space 2 for recharging the vehicle. The recharging station 4 is of a conventional type and, for example, has a connection socket 5 for a charging cable 6 for supplying charging current to the vehicle 3. The recharging station 4 is supplied with current by means of a local power network 7 from a public power supply network 8.

Each recharging station 4 is controlled by a transceiver 9, which has an electronic module 10 and a duplexer 11 connected thereto. The duplexer 11 has a directed communication zone 12, which is restricted to the region of the parking space 2 of the respective assembly 1. The transceiver 9 can communicate with radio units 13 (arrow 14) carried by the vehicles 3 only in this communication zone 12 or this restricted region of the parking space 2.

Each radio unit 13 is fitted individually for the respective vehicle 3, that is, with a vehicle-specific code, which can be exchanged with the transceiver 9 during the course of the communication 14 and identifies the vehicle 3 to the assembly 1.

In some embodiments, the radio units 13 are fixed onboard units (OBUs) such as, those also used as part of conventional wireless road toll systems and that can be scanned by roadside radio beacons, for example, to charge a fee for road or car park usage. Such road toll systems operate according to the DSRC or WAVE standards. Accordingly, radio units 13 are in particular DSRC or WAVE OBUs and the transceiver 9 has about the same functionality as a DSRC or WAVE beacon of a road toll system.

The transceiver 9 or its electronic module 10 connects to other assemblies 1, a local network and/or a control center of the road toll system (not shown) by means of a data line 16.

The transceiver 9 controls the recharging station 10 via communication 14 with a radio unit 13 located in its communication zone 12. Appropriate programming of the electronic module 10 ensures that the recharging station 4 is only activated/cleared to recharge the vehicle 3 when the vehicle 3 has notified or indicated accordingly, via its radio unit 13. As a result, the payment of the recharging process is assured. The payment can be made, for example, by means of a prepaid account, which is stored in an electronic account in the radio unit 13, or by means of a postpaid account, which is managed in the control center of the road toll system. Corresponding transactions can also be made via the data line 16 for this purpose.

A camera 15 directed towards the parking space 2 is connected to the electronic module 10. The recharging station 4 monitors the recharging process and causes the camera 15 to record an image in the event of any interruption, interference and/or any deviation of the recharging process from a given course, for example a predetermined charging current or charging voltage range or a predetermined charging characteristic, via, the electronic module 10. If a shielded charging cable 6 is used, interferences with the shield of the charging cable can be detected electrically and manipulation of the charging cable can thus be detected from the outset. An image can also optionally be taken by the camera 15 for evidence purposes at the beginning and at the end of any one recharging process. The recorded images of the camera 15 can be transmitted together with further data of the assembly 1 via the data line 16 to corresponding evaluation devices, for example the control center of a road toll system.

Figure 2:
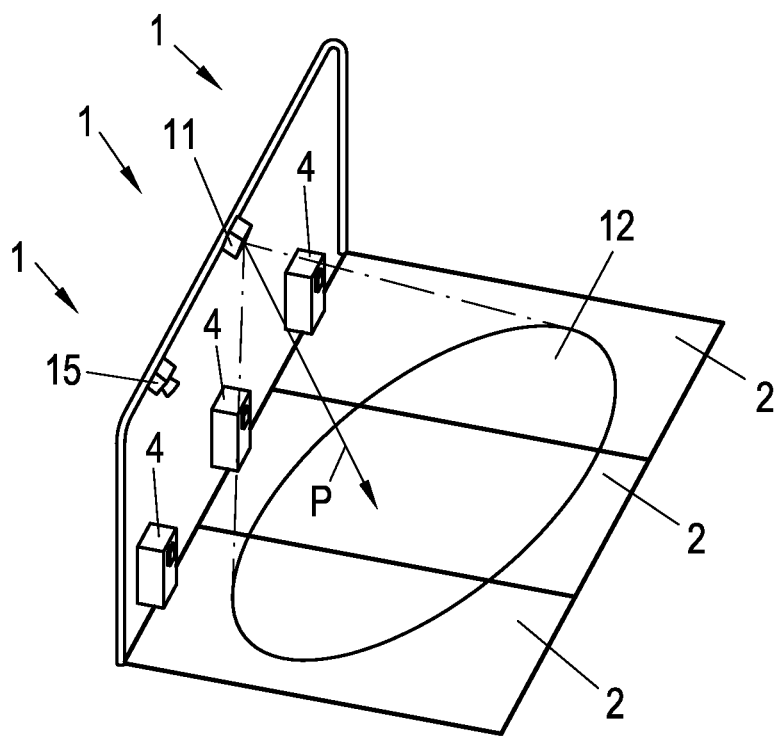
FIG. 2 is an exemplary schematic perspective view of a charging assembly, according to some embodiments of the present invention.

FIG. 2 shows another embodiment of the assembly 1, wherein the same reference numerals relate to the same elements. In this embodiment, a single transceiver 9 with a larger communication zone 12 covering multiple parking spaces 2 is provided for multiple assemblies 1. In other words, the communication zone 12 is not restricted to the region of a parking space 2 here. Instead, the transceiver 9 is configured by appropriate configuration of its duplexer 11, for example, to locate the location P of an radio unit 13 in the communication zone 12, so that an unequivocal assignment can also be made here between a radio unit 13 and a parking spaced 2 of the assembly 1.

Any technology known in the art can be used for locating location P, for example, run time measurements, triangulation processes or the receipt of stand-alone position messages of the radio units 13, for example if these can locate themselves by means of satellite navigation systems or the like.

Each parking space 2 can be provided with its own camera 15 or multiple parking spaces 2 can share a joint camera 15.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. An assembly for electrically recharging vehicles, to each of which a vehicle-based radio unit is assigned, comprising:
 a plurality of parking spaces for one vehicle each
 a plurality of recharging stations, each of which is assigned to one of said parking spaces for recharging a vehicle by a charging cable; and
 a transceiver electrically coupled to the recharging stations for communicating with the radio units,
 wherein for all parking spaces of said plurality of parking spaces the transceiver is provided as a common transceiver which has a communication zone covering all parking spaces of said plurality of parking spaces, and
 wherein the transceiver is configured to locate a radio unit as being located in one of said parking spaces, to identify the vehicle that the radio unit is assigned to as being located in said parking space, and to activate the recharging station assigned to said parking space for the recharging process based on the communication with the radio unit.

2. The assembly according to claim 1, wherein the transceiver is configured as a radio beacon for communication with the radio unit, and wherein the radio unit is a vehicle-based OBU of a wireless road toll system.

3. The assembly according to claim 2, wherein the transceiver is a short-range communication (DSRC) or wireless access in a vehicle environment (WAVE) beacon for communication with DSRC or WAVE OBUs.

4. The assembly according to claim 1, wherein the electrical charging parameters of the recharging are controlled on the basis of data read from the radio unit by the transceiver.

5. The assembly according to claim 2, wherein the transceiver transmits transactions concerning the recharging processes to a control center.

6. The assembly according to claim 1, further comprising a camera directed towards the parking space, wherein the recharging station activates the camera to record an image at a beginning and an end of the recharging.

7. The assembly according to claim 1, further comprising a camera directed towards the parking space, wherein the recharging station activates the camera to record an image in the event of an interruption, interference or deviation of the recharging process from a given course.

8. The assembly according to claim 7, wherein the recharging station includes a shielded charging cable for connection to the vehicle, and wherein in the event of interference with the shield of the charging cable, an image is recorded by the camera.

* * * * *

UNITED STATES PATENT AND TRADEMARK OFFICE
CERTIFICATE OF CORRECTION

| | | |
|---|---|---|
| PATENT NO. | : 9,056,554 B2 | Page 1 of 1 |
| APPLICATION NO. | : 13/928298 | |
| DATED | : June 16, 2015 | |
| INVENTOR(S) | : Oliver Nagy | |

It is certified that error appears in the above-identified patent and that said Letters Patent is hereby corrected as shown below:

On the title page, in column 2, in "Primary Examiner", line 1, delete "Edwards" and insert -- Edward --, therefor.

In the claims

In column 4, line 17, in claim 1, delete "each" and insert -- each; --, therefor.

Signed and Sealed this
First Day of December, 2015

Michelle K. Lee
*Director of the United States Patent and Trademark Office*